(12) United States Patent
Stuart-Bruges

(10) Patent No.: US 6,639,404 B1
(45) Date of Patent: Oct. 28, 2003

(54) DEVICE FOR MEASURING FLOW RATE

(75) Inventor: William Peter Stuart-Bruges, Basingstoke (GB)

(73) Assignee: Lucas + Co., Surrey (GB)

( * ) Notice: Subject to any disclaimer, the term of this patent is extended or adjusted under 35 U.S.C. 154(b) by 0 days.

(21) Appl. No.: 10/018,109

(22) PCT Filed: Jun. 15, 1999

(86) PCT No.: PCT/GB00/02324
§ 371 (c)(1),
(2), (4) Date: Dec. 13, 2001

(87) PCT Pub. No.: WO00/77477
PCT Pub. Date: Dec. 21, 2000

(30) Foreign Application Priority Data

Jun. 15, 1999 (GB) .............................. 9913924

(51) Int. Cl.⁷ .............................. G01V 3/00; G01F 1/00
(52) U.S. Cl. ...................... 324/306; 73/861; 73/861.08; 73/861.12
(58) Field of Search ................................ 324/658, 637, 324/688, 672, 679, 686, 691, 701, 704, 306; 73/861, 861.08, 861.12

(56) References Cited

U.S. PATENT DOCUMENTS

| 5,103,181 A | 4/1992 | Gaisford et al. ............ 324/637 |
| 5,546,006 A | 8/1996 | Louge ........................ 324/688 |

FOREIGN PATENT DOCUMENTS

| EP | 0372598 | 6/1990 |
| EP | 372598 A2 * | 6/1990 ........... E21B/47/00 |
| EP | 0487227 | 5/1992 |

* cited by examiner

Primary Examiner—N. Le
Assistant Examiner—Donald M. Lair
(74) Attorney, Agent, or Firm—Baker Botts L.L.P.

(57) ABSTRACT

A device for measuring the rate of flow of fluids in a conduit is positioned within the conduit and includes a tube having two spaced part detectors which are separated by shielding units either side of them which are not in electrical contact with the detector units, when a variable electrical field is applied between the walls of the conduit and the shielding units the detector units detect discontinuities in the fluid, e.g., by detecting changes in the ratio of voltage to current and by correlating the movement of the discontinuities between the detector units, it is possible to measure the rate of flow of the fluid.

18 Claims, 1 Drawing Sheet

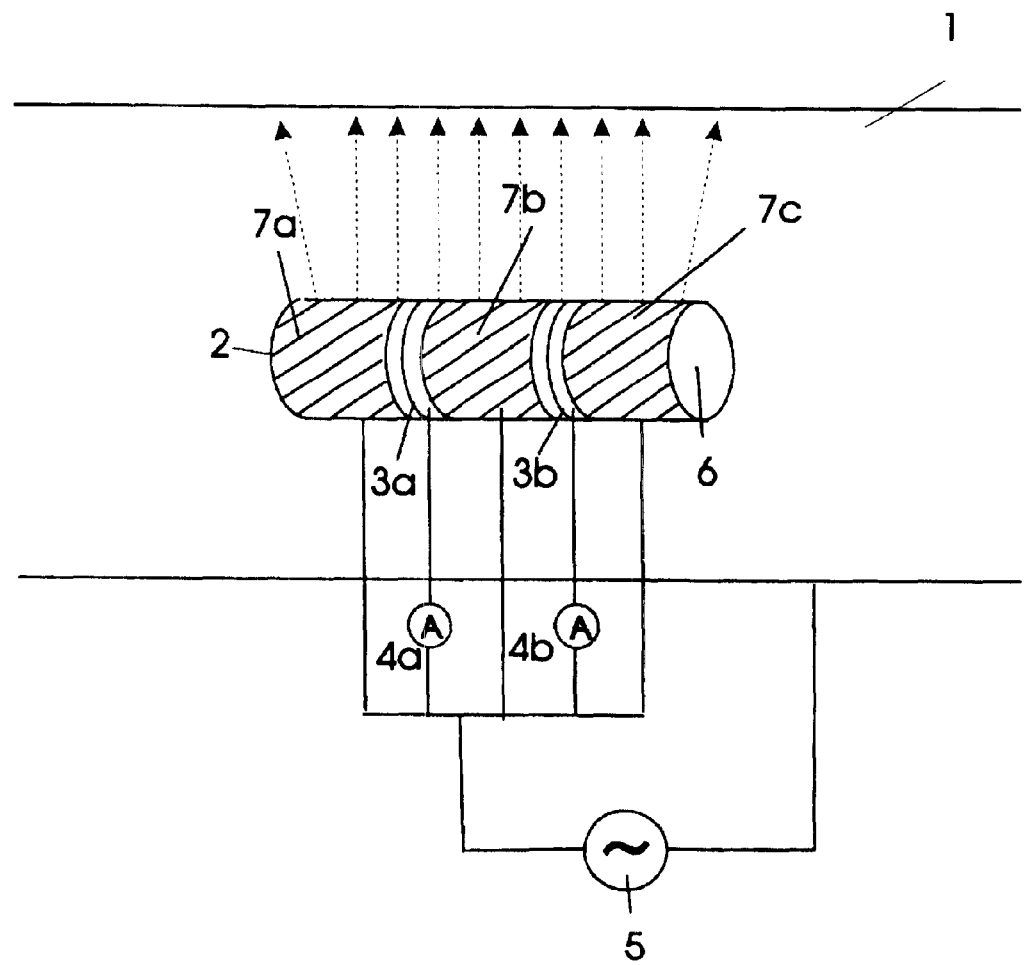

DEVICE FOR MEASURING FLOW RATE

BACKGROUND OF THE INVENTION

The present invention for measuring the rate of flow of liquids in conduits.

It is known to measure the rate of flow of liquids in conduits by having two spaced apart detection means outside the conduit which can detect discontinuities in the liquid flowing through the conduit. The discontinuities can be bubbles, solid impurities and other areas of different phase to the bulk liquid. Using conventional detection methods, such as measuring capacitance, or other electrical properties, using ultra-sonic or short wavelength radiation, etc., the pattern of the discontinuities can be continuously measured and plotted at each location. The plot of the discontinuities at each location are then correlated electronically and this is used to measure the time taken for the discontinuities to pass sequentially to the two detectors, this measures the flow rate of the discontinuities and hence the flow rate of the liquid. Although the method involves assumptions about the uniform nature and flow rate of the discontinuities, in practice it can give a useful measurement of the flow rate of the liquid.

SUMMARY OF THE INVENTION

We have now devised an improved method of measuring the flow rate of liquids in conduits and equipment for measuring the flow rate of liquids in conduits.

According to the invention there is provided a method for measuring the flow rate of a fluid in a conduit, which method comprises placing within the flowing fluid a detector unit which comprises two linearly spaced apart detectors which have a shielding unit made from an electrically conductive material positioned between them, but not in electrical contact with them, and which have a shielding unit made from an electrically conductive material upstream and downstream of the detectors and adjacent, but not in electrical contact with them, which method comprises applying an electrical field between the detector unit and the wall of the conduit and measuring variations in the electrical field by means of the detectors and, by correlating discontinuities in the electrical field, measuring the flow rate of the fluid.

The invention also provides a device for measuring the flow rate of fluids in a conduit which device is adapted to fit within the conduit and comprises two spaced apart detector means capable of detecting and measuring an electric field, which detector means have positioned between them and either side of them, but not in electrical contact with them, shielding units made from an electrically conductive material, the shielding units being in electrical contact with each other and the detector means being connected to a measuring means able to measure variations in the electrical field between the conduit wall and the device, there being means to apply an electrical field between the detector unit and the wall of the conduit.

By correlating the variations in the electric field, as measured by the detector means, between the device and the wall of the conduit the speed of flow of the bulk fluid can be measured.

BRIEF DESCRIPTION OF THE DRAWINGS

FIG. 1 shows one exemplary embodiment of the device for measuring flow rate according to the present invention.

DETAILED DESCRIPTION

Preferably the device is made so that the fluid can flow around the device with minimal disturbance to the flow of the fluid, for example it is in the form of a cylinder. The shielding units and detectors are then positioned linearly along this cylinder in the sequence: shielding unit, detector, shielding unit, detector, shielding unit. Preferably the shielding units have a linear dimension such that the electrical field between them and the conduit wall is approximately vertically uniform for at least part of the length of the device, although the field strength will vary as the inverse of the distance between the cylinder and the conduit. If the shielding unit is too short then the electrical field will tend to radiate out in a nonuniform way which can affect the accuracy of the measurements.

When the device is in the form of a cylinder the shielding units can be in the form of a sleeve extending at least partially, and preferably entirely circumferentially, around the cylinder and the length of the sleeve is preferably at least equal to the distance between the cylinder and the conduit and preferably is at least twice this distance, i.e., at least equal to the difference in the radii of the cylinder and the conduit and preferably twice this difference. The maximum length of the cylinder is not critical but for convenience and avoidance of expense a length of up to four times the diameter of the cylinder is convenient.

In one embodiment of the invention a variable electrical field is applied between the walls of the conduit and the shielding units and the detector means measure, at the detectors, variations in electrical properties of the fluid flowing down the tube using conventional methods. The means for detecting the variations in field strength can detect variations in the ratio of voltage to current, in capacitance, etc.

The applied electrical potential is not critical and a voltage of 0.5 to 10 volts is convenient.

The variations in the ratio of voltage to current or other electrical properties at each of the two detector units can be fed to a correlating means, where they are correlated so that the time taken by discontinuities in the liquid to traverse the distance between the detector units can be measured. This correlation can be carried out using known conventional best fit or other analytical methods.

The conduit can be any shape although normally it will be of circular cross section and preferably the device will be positioned substantially centrally in the conduit.

The gap between the device and the walls of the conduit is not critical, but it should not be too large so that variations in the electrical fields are too small to detect and the length of the shielding units can be increased to take into account the distance from the device to the conduit.

The invention is useful in measuring the flow rates of fluids or liquids such as oil or petroleum in pipelines.

An embodiment of the invention is illustrated in FIG. 1 in which a metal pipeline (1) carrying fluid has the device (2) placed within it. The device (2) consists of a cylinder (6) to which are circumferentially attached, detector units (3a) and (3b) which are connected, via ammeters (4a) and (4b), to a source of variable electric field (5) and metal shielding units (7a), (7b) and (7c) which substantially longer than the width of the tube. The shielding units are attached to the source of variable electric field (5) as shown. The detector units and shielding units are not in contact and are electrically insulated from each other than being connected to the common power source (5) as shown.

In use, there is an electric field generated between the units (3a), (3b), (7a), (7b) and (7c) and the walls of the pipeline as diagrammatically shown by the arrows. The detector units (3a) and (3b) measure the variation in the electrical properties of the fluid at the detectors of the liquid in the pipeline between them and the walls of the pipeline. When discontinuities pass down the pipeline they cause a variation in the electrical properties of the fluid in the pipeline, which is detected by the detector units (3a) and (3b). The use of the shielding units (7a), (7b) and (7c) to generate the field means that the field is more vertically uniform between the detector units (3a) and (3b) and the walls of the pipeline than would otherwise be the case if there were no shielding units.

By knowing the distance apart of the detector units (3a) and (3b), and by measuring the time taken for discontinuities in the resistivity of the liquid to traverse this distance a measure of the flow rate of the liquid is obtained.

What is claimed is:

1. A device for measuring the flow rate of fluids in a conduit which device is adapted to fit within the conduit and comprises
   (i) two spaced apart detector means a known distance apart capable of detecting and measuring an electric field,
   (ii) shielding units made from an electrically conductive material and
   (iii) means to apply an electrical field between the device and the wall of the conduit, the shielding units being positioned between the detector means and being in electrical contact with each other but not in electrical contact with the detector means and the detector means being connected to a measuring means able to measure variations in the electrical field between the conduit wall and the device.

2. A device according to claim 1 which is in the form of a cylinder and the shielding units and detector means are positioned linearly along this cylinder in the sequence shielding unit, detector, shielding unit, detector, shielding unit.

3. A device according to claim 2 in which the shielding units are in the form of a sleeve extending at least partially circumferentially around the cylinder.

4. A device according to claim 1 in which the shielding units have a linear dimension such that the electrical field between them and the conduit wall is approximately vertically uniform for at least part of the length of the device.

5. A device according to claim 1 in which the shielding units have a linear dimension such that the electrical field between them and the conduit wall is approximately axially uniform for at least part of the length of the device.

6. A device according to claim 5 in which length of the sleeve is at least equal to the distance between the cylinder and the conduit.

7. A device according to claim 5 in which length of the sleeve is at least equal to twice the distance between the cylinder and the conduit.

8. A method for measuring the flow rate of a fluid in a conduit, which method comprises placing within the flowing fluid a detector unit which comprises two linearly spaced apart detectors which have a shielding unit made from an electrically conductive material positioned between them, but not in electrical contact with them, and which have a shielding unit made from an electrically conductive material upstream and downstream of the detectors and adjacent, but not in electrical contact with them, which method comprises applying an electrical field between the device and the wall of the conduit and measuring variations in the electrical field by means of the detectors and, by correlating discontinuities in the electrical field, measuring the flow rate of the fluid.

9. A method according to claim 8 in which the device is in the form of a cylinder so that the fluid can flow around the device with minimal disturbance to the flow of the fluid.

10. A method according to claim 9 in which the shielding units and detectors are positioned linearly along the cylinder in the sequence shielding unit, detector, shielding unit, detector, shielding unit.

11. A method according to claim 9 in which the electrical field between the shielding units and the conduit wall is approximately axially uniform for at least part of the length of the device.

12. A method according to claim 11 in which a variable electrical field is applied between the walls of the conduit and the shielding units and the detector means detect variations in the electrical properties of the fluid flowing down the tube.

13. A method according to claim 12 in which the variations in the electrical properties which are detected are variations in the ratio of voltage to current.

14. A method according to claim 13 in which the variations in the electrical properties of the fluid at each of the two detector units are fed to a correlating means where they are correlated so that the time taken by a discontinuity pattern to traverse the distance between the detector units is measured.

15. A method according to claim 12 in which the variations in the electrical properties which are detected are variations in the capacitance of the fluid.

16. A method according to claim 15 in which the variations in the electrical properties of the fluid at each of the two detector units are fed to a correlating means where they are correlated so that the time taken by a discontinuity pattern to traverse the distance between the detector units is measured.

17. A method according to claim 8 in which the electrical field between the shielding units and the conduit wall is approximately axially uniform for at least part of the length of the device.

18. A method according to claim 8 in which a variable electrical field is applied between the walls of the conduit and the shielding units and the detector means detect variations in the electrical properties of the fluid flowing down the tube.

* * * * *

UNITED STATES PATENT AND TRADEMARK OFFICE
CERTIFICATE OF CORRECTION

PATENT NO. : 6,639,404 B1
DATED : October 28, 2003
INVENTOR(S) : Stuart-Bruges

It is certified that error appears in the above-identified patent and that said Letters Patent is hereby corrected as shown below:

Title Page,
Item [73], Assignee, "Lucas + Co., Surrey (GB)" should read
-- Sondex Limited-Hampshire, United Kingdom --

Signed and Sealed this

Twenty-fifth Day of May, 2004

JON W. DUDAS
*Acting Director of the United States Patent and Trademark Office*